United States Patent [19] [11] 3,991,260
Matsuura et al. [45] Nov. 9, 1976

[54] PROCESS FOR PREPARING POLYOLEFINS

[75] Inventors: Kazuo Matsuura, Kawasaki; Nobuyuki Kuroda, Yokohama; Takeichi Shiraishi, Kawasaki; Mituji Miyoshi, Kanagawa, all of Japan

[73] Assignee: Nippon Oil Corporation Ltd., Tokyo, Japan

[22] Filed: Oct. 7, 1974

[21] Appl. No.: 512,989

[30] Foreign Application Priority Data
Oct. 9, 1973    Japan............................ 48-112781
Mar. 22, 1974   Japan............................ 49-31531

[52] U.S. Cl. .......................... 526/125; 252/429 C; 526/155; 526/348; 526/352; 526/906
[51] Int. Cl.² .................... C08F 4/02; C08F 10/02
[58] Field of Search .......... 260/88.2, 93.7, 94.9 DA, 260/94.9 E; 526/125

[56] References Cited
FOREIGN PATENTS OR APPLICATIONS
1,958,046   6/1970   Germany
1,958,488   5/1970   Germany
2,000,566   11/1970  Germany
2,365,235   7/1974   Germany
2,137,872   2/1972   Germany Primary Examiner—Edward J. Smith

[57] ABSTRACT

Process for preparing polyolefins by polymerizing or copolymerizing olefins in the presence of an organometallic compound and a catalyst comprising magnesium, titanium and aluminum or magnesium, vanadium and aluminum, the catalysts being prepared by copulverizing a magnesium dihalide, an aluminum alkoxide and a titanium or vanadium compound.

11 Claims, No Drawings

PROCESS FOR PREPARING POLYOLEFINS

BACKGROUND OF THE INVENTION

1. Field of the Invention

The present invention is concerned with a process for preparing polyolefins using an improved polymerization catalyst. More particularly, it relates to a process for preparing polyolefins by polymerizing or copolymerizing olefins using an organometallic compound and a catalyst comprising magnesium, titanium and aluminum or magnesium, vanadium and aluminum, the catalyst being prepared from a magnesium dihalide, an aluminum compound represented by the formula Al(OR)$_3$ wherein R is a hydrocarbon radical all three of which may or may not be identical in a particular compound and a divalent or trivalent vanadium compound or a divalent, trivalent or tetravalent titanium compound. The preferred organometallic compounds are organoaluminum, and organozinc compounds.

2. Description of the Prior Art

In the technical field of this sort there has heretofore been known a catalyst comprising a transition metal such as titanium and vanadium supported on a magnesium dihalide (see Japanese Pat. Publication No. 12105/1964). Further, in Belgian Pat. No. 742112 there is referred to a catalyst obtained by activating an anhydrous magnesium dihalide by means of a ball mill and making a titanium tetrachloride supported thereon.

In the preparation of polyolefins, however, it is desirable that the catalyst activity be as high as possible. From this point of view, with the process of Japanese Pat. Publication No. 12105/1964, the polymerization activity is still low, while, with the process of Belgian Pat. No. 742112, a considerably higher polymerization activity is attained but still desired to be improved.

In the case of German Pat. No. 2137872, a substantial reduction in the amount of MgCl$_2$ used is attained by copulverizing a magnesium dihalide, TiCl$_4$ and Al$_2$O$_3$, but there is recognized no remarkable increase in activity per solid, a barometer of productivity, and thus a catalyst of a higher activity is still desired.

In Japanese Patent Public Disclosure No. 21777/1973 it is described that the activity is improved by the copulverization of a magnesium dihalide, TiCl$_4$ and an aluminum halide-ether complex. Such a method, however, is disadvantageous in that the said three components all are halogen-containing substances and their halogen content is relatively high.

There has been known an example in which a magnesium dihalide and titanium trichloride were ball-milled (see Japanese Pat. Publication No. 46269/1972). It is also known from Japanese Pat. Publication No. 19885/1972 to ball-mill magnesium hydroxychloride and titanium trichloride.

In the preparation of polyolefins, however, the catalyst activity is desired to be as high as possible. From this point of view the polymerization activity in the case of the methods described in Japanese Pat. Publications Nos. 46269/1972 and 19885/1972 is still unsatisfactory and desired to be improved.

Also in the physical properties of the resulting polyolefins, a further improvement is desired as in the case of catalyst activity. For example, the impact resistance of injection moldings is desired to be as high as possible.

SUMMARY OF THE INVENTION

The present invention relates to a process for preparing a new polymerization catalyst which has an extremely high activity and in which an improvement has been made against all the above drawbacks of the prior art, and to a process for polymerizing or copolymerizing olefins using the said polymerization catalyst. According to the process of the present invention, the polymerization activity is so high that the partial pressure of monomer in polymerization is low and the amount of residual catalyst in the polymer formed after polymerization in an extremely short period of time is very low. Consequently, the step of removing the catalyst can be omitted, so that the polymerization conditions are moderate and the polymer-treating step is simplified. As a result, there is provided a process for preparing polyolefins which, as a whole, is extremely economical.

The process of the present invention is further characterized in that the bulk density of the resulting polymer is high and that therefore the amount of polymer formed per unit solvent is large.

Another advantage of the invention is as mentioned below.

Those polyethylenes obtained using the catalyst of the present invention have a high bulk density as set forth hereinbefore and, if the concentration of hydrogen is same, they are of a higher melt index as compared with polyethylenes obtained by use of a catalyst containing no Al(OR)$_3$ (as described in Comparative Examples), so that a lower concentration of hydrogen would suffice for obtaining a polymer of a desired melt index, and thus the total pressure in polymerization can be made relatively low. These merits highly contribute to productivity and inexpensiveness.

A still another advantage of the present invention is that the polymerization of ethylene using the catalyst of the invention is accompanied by little reduction in the absorption rate of ethylene in prolonged time, which enables polymerization in prolonged time to be conducted with a smaller amount of catalyst.

A still another advantage of the present invention is that polymers obtained using the catalyst of the invention have a high Izod impact strength.

The present invention provides a new catalyst system which has such a lot of characteristic features and in which the foregoing drawbacks of the prior art have been eliminated The use of the catalyst of the present invention enables the foregoing advantages of the invention to be obtained with ease; this ought to be considered surprising.

DESCRIPTION OF THE INVENTION

Magnesium dihalides which may be employed in the present invention are substantially anhydrous ones. Illustrative are magnesium difluoride, magnesium dichloride magnesium dibromide, and magnesium diiodide, among which magnesium dichloride is particularly preferable.

As the compounds represented by the general formula Al(OR)$_3$ wherein R is a hydrocarbon radical having 1 to 20, preferably 1 to 8, carbon atoms and may be the same or different, which are employed in the present invention, there are mentioned aluminum trimethoxide, aluminum triethoxide, monomethoxydiethoxyaluminum, aluminum tri-n-propoxide, aluminum triisopropoxide, monomethoxydiisopropoxyaluminum, aluminum tri-n-butoxide, aluminum tri-sec-butoxide, aluminum tri-t-butoxide, and aluminum triphenoxide, among which aluminum trimethoxide and aluminum triethoxide are particularly preferable.

With respect to the tetravalent titanium compounds used in the invention there is no particular limitation, but, as concrete examples, there are mentioned titanium tetrachloride, titanium tetrabromide, monoethoxytitanium trichloride, diethoxytitanium dichloride, titanium tetraethoxide, dibutoxytitanium dichloride, titanium tetrabutoxide, and phenoxytitanium trichloride.

Copulverization of magnesium dihalides and such aluminum compounds may usually be conducted in the presence of tetravalent titanium compounds. Alternatively, it may be done first with respect to any two of the said three and thereafter the remaining one may be mixed with the resulting copulverized matter, followed by a further copulverization. It goes without saying that these operations should be conducted in an inert gas atmosphere and that moisture should be avoided as far as possible.

Typical of the solid titanium or vanadium compounds used in the invention are tri- or di-valent titanium or vanadium compounds. They are, for example, titanium trichloride, vanadium trichloride, titanium oxychloride, vanadium oxychloride, titanium dichloride, and vanadium dichloride, among which titanium trichloride is specially preferable.

As the titanium trichloride may be used those obtained by reduction of titanium tetrachloride with hydrogen or a metal such as aluminum and titanium, and those obtained by partial reduction of titanium tetrachloride with an organoaluminum compound such as trialkylaluminum and diethylaluminum monochloride or an organomagnesium compound typical of which is Grignard reagent.

The copulverization of a magnesium dihalide, an aluminum compound and a solid titanium and/or vanadium compound in the present invention may be done simultaneously in the presence of the said three. Alternatively, it may be done first with respect to any two of the said three and thereafter the remaining one may be mixed with the resulting copulverized matter, followed by a further copulverization.

Of course these operations should be done in an inert gas atmosphere, and moisture should be avoided as far as possible.

With respect to the mixing ratio of magnesium dihalide to aluminum compound, a too small or too large proportion of aluminum compound is likely to result in the reduction in polymerization activity. Consequently, for the preparation of highly active catalysts, the molar ratio of Mg/Al is in the range from 1:0.01 to 1:1, preferably from 1:0.01 to 1:1, preferably from 1:0.05 to 1:0.5.

The amount of titanium and/or vanadium compound to be supported is most preferably adjusted so that the amount of titanium and/or vanadium contained in the resulting solid is in the range from 0.5 to 10% by weight; and for achieving a wellbalanced activity per titanium and/or vanadium and per solid, it is particularly desirable that such amount be in the range from 1 to 8% by weight.

The apparatus used in the copulverization is not particularly limited, but usually employed are a ball mill, a vibration mill, a rod mill and an impact mill. Conditions according to each pulverizing system, such as the order of mixing and the pulverizing time and temperatures can readily be determined by those skilled in the art.

The polymerization reaction of olefins using the catalyst of the invention is conducted in the same manner as in the olefin polymerization reaction by means of a conventional Ziegler catalyst. Substantially oxygen- and moisture-free conditions are maintained throughout the reaction. The polymerization conditions for olefins include a temperature in the range from 20° to 300° C., preferably 50° to 180° C., and a pressure in the range from normal to 70 kg/cm$^2$, preferably from 2 to 60 kg/cm$^2$. Control of molecular weight can be done to a certain degree by changing polymerization conditions such as polymerization temperatures and the molar ratio of catalyst, but can more effectively be done by addition of hydrogen into the polymerization system. With the catalyst of the invention, of course, two- or more-stage polymerization reactions having different polymerization conditions such as hydrogen concentration and polymerization temperatures can also be done without any trouble.

The process of the present invention can be applied to the polymerization of all the olefins polymerizable with Ziegler catalyst. For example, it is suitably employed for homopolymerization of olefins such as ethylene, propylene, and 1-butene, and for copolymerization of ethylene and propylene, ethylene and 1-butene, and propylene and 1-butene.

As the organometallic compound used in the invention may be mentioned organometallic compounds from metals of Group I–IV of the Periodic Table which is generally known as a component of Ziegler catalyst, and especially preferable are organo-aluminum and organozinc compounds. Illustrative are organoaluminum compounds of the general formulae $R'_3Al$, $R'_2Alx$, $R'AlX_2$, $R'_2AlOR$, $R'Al(OR')X$ and $R'_3Al_2X_3$ wherein $R'$ is alkyl or aryl and may be the same or different and X is halogen and organozinc compounds of the general formula $R''_2Zn$ wherein $R''$ is alkyl and may be the same or different including triethylaluminum, triisobutylaluminum, trihexylaluminum, trioctylaluminum, diethylaluminum chloride, ethylaluminum sesquichloride, diethylzinc and mixtures thereof. There is no limitation to the amount of organometallic compound used in the invention and the compound is usually used at a molar ratio from 0.1 to 1000 against the transition metal halogenide.

DESCRIPTION OF PREFERRED EMBODIMENTS

The examples which follow are submitted to illustrate and not to limit the invention.

EXAMPLE 1 a. Preparation of the catalyst 9.5 g. (0.1 mol) of a commercially available anhydrous magnesium dichloride (treated in HCl gas stream at 350° C. for 20 hrs.), 4.1 g. (0.025 mol) of aluminum triethoxide and 2.6 g. of TiCl$_4$ were placed in a stainless steel not having a content volume of 400 ml. and containing 25 stainless steel balls each ½ inch in diameter, and then subjected to ball milling for 16 hrs. at room temperature under a nitrogen atmosphere. As a result, there was obtained a white, powdered solid, on which was supported 42.1 mg. of titanium per g. of the solid.

b. Polymerization

A 2 liter stainless steel autoclave equipped with an induction stirrer was purged with nitrogen and charged with 1000 ml. of hexane. To it were added 3 mmol. of triethylaluminum and 42.6 mg. of the above-mentioned solid and the temperature was raised to 90° C. with stirring. The system, which was at a pressure of 2 kg/cm$^2$ from vapor pressure of the hexane, was pressurized with hydrogen to a total pressure of 6 kg/cm$^2$ and then with ethylene to a total pressure of 10 kg/cm$^2$ followed by initiation of the polymerization. Ethylene was continuously introduced to maintain the total pressure at 10 kg/cm$^2$ while conducting the polymerization for 45 min. After completion of the polymerization, the polymer slurry was transferred to a beaker, from which the hexane was removed under reduced pressure to obtain 256 g. of white polyethylene with a melt index of 33 and a bulk density of 0.34. The catalyst activity was 47,500 g. polyethylene/g. Ti·hr.·C$_2$H$_4$ pressure, 2,000 g. polyethylene/g. solid·hr.·C$_2$H$_4$ pressure, which was extremely superior to that in Comparative Example 1 wherein was used no Al(OEt)$_3$.

COMPARATIVE EXAMPLE 1

9.5 g. (0.1 mol) of magnesium dichloride and 0.6 g. of TiCl$_4$ were pulverized together in the same way as in Example 1 to give a white, powdered solid with 15.8 mg. of titanium per g. supported. A polymerization was conducted for 45 min. in the same manner as in Example 1 except that 75.4 mg. of the said solid was employed, to yield 119 g. of white polyethylene with a melt index of 5.2 and a bulk density of 0.20. The catalyst activity was 33,400 g. polyethylene/g. Ti·hr.·C$_2$H$_4$ pressure, 530 g. polyethylene/g. solid·hr.·C$_2$H$_4$ pressure, which was apparently inferior to that in Example 1.

EXAMPLE 2

9.5 g. (0.1 mol) of MgCl$_2$, 4.1 g. (0.025 mol) of Al(OEt)$_3$ and 1.2 g. of TiCl$_4$ were pulverized together in the same way as in Example 1 to give a solid with 21 mg. of titanium per g. supported. A polymerization was conducted for 45 min. in the same manner as in Example 1 except that 38 mg. of the above catalyst was used, to yield 145 g. of white polyethylene with a melt index of 22.5 and a bulk density of 0.33. The catalyst activity was extremely high: 61,000 g. polyethylene/g. Ti·hr.·C$_2$H$_4$ pressure, 1,280 g. polyethylene/g. solid·hr.·C$_2$H$_4$ pressure.

EXAMPLE 3

9.5 g. (0.1 mol) of MgCl$_2$, 4.1 g. (0.025 mol) of Al(OEt)$_3$ and 4.2 g. of TiCl$_4$ were pulverized together in the same way as in Example 1 to give a solid with 58 mg. of titanium per g. supported. A polymerization was conducted for 45 min. in the same manner as in Example 1 except that 31 mg. of the above catalyst was used, to yield 218 g. of white polyethylene with a melt index of 28 and a bulk density of 0.37. The catalyst activity was 40,000 g. polyethylene/g. Ti·hr.·C$_2$H$_4$ pressure, 2,340 g. polyethylene/g. solid·hr.·C$_2$H$_4$ pressure, which was maintained high even with the amount of titanium supported of about 6%.

COMPARATIVE EXAMPLE 2

9.5 g. (0.1 mol) of MgCl$_2$ and 0.9 g. of TiCl$_4$ were pulverized together in the same way as in Example 1 to give a solid with 22 mg. of titanium per g. supported. A polymerization was conducted for 45 min. in the same manner as in Example 1 except that 55.6 mg. of the said solid was used, to yield 76 g. of white polyethylene with a melt index of 4.9 and a bulk density of 0.19. The catalyst activity was 20,700 g. polyethylene/g. Ti·hr.·C$_2$H$_4$ pressure, 455 g. polyethylene/g. solid·hr.·C$_2$H$_4$ pressure. The activity per solid did not increase even with increasing amount of TiCl$_4$.

EXAMPLE 4

9.5 g. (0.1 mol) of MgCl$_2$ 1.6 g. (0.01 mol) of Al(OEt)$_3$ and 1.0 g. of TiCl$_4$ were pulverized together in the same way as in Example 1 to give a solid with 21 mg. of titanium per g. supported. A polymerization was conducted for 45 min. in the same manner as in Example 1 except that 39 mg. of the above catalyst was used, to yield 129 g. of white polyethylene with a melt index of 25 and a bulk density of 0.31. The catalyst activity was extremely high; 52,500 g. polyethylene/g. Ti·hr.·C$_2$H$_4$ pressure, 1,000 g. polyethylene/g. solid·hr.·C$_2$H$_4$.

EXAMPLE 5

With the same composition of MgCl$_2$, Al(OEt)$_3$ and TiCl$_4$ as in Example 1, MgCl$_2$ and Al(OEt)$_3$ were subjected to ball milling for 16 hrs. at room temperature, to which was then added TiCl$_4$ followed by ball milling for 16 hrs. at room temperature. As a result, there was obtained a solid with 40.3 mg. of titanium per g. supported. A polymerization was conducted for 45 min. in the same manner as in Example 1 except that 31 mg. of the above catalyst was used, to yield 181 g. of white polyethylene with a melt index of 23 and a bulk density of 0.33. The catalyst activity was extremely high 48,200 g. polyethylene/g. Ti·hr.·C$_2$H$_4$ pressure, 1,950 g. polyethylene/g. solid·hr.·C$_2$H$_4$ pressure.

EXAMPLE 6

A polymerization was conducted for 3 hrs. in the same way as in Example 1 except that 16 mg. of the catalyst prepared in Example 1 was used, to give 300 g. of white polyethylene with a melt index of 18 and a bulk density of 0.39. The catalyst activity was 37,100 g. polyethylene/g. Ti·hr.·C$_2$H$_4$ pressure, 1,560 g. polyethylene/g. solid·hr.·C$_2$H$_4$ pressure. The reduction in activity was about 25% as compared with the case in which polymerization was made for 45 min. (Example 1).

COMPARATIVE EXAMPLE 3

A polymerization was conducted for 3 hrs. in the same way as in Example 1 except that 24 mg. of the catalyst prepared in Comparative Example 1 was used, to yield 69 g. of white polyethylene with a melt index of 2.8 and a bulk density of 0.22. The catalyst activity was 15,200 g. polyethylene/g. Ti·hr.·C$_2$H$_4$ pressure, 240 g. polyethylene/g. solid·hr.·C$_2$H$_4$ pressure. It was reduced to about half as compared with the case in which polymerization was made for 45 min. (Comparative Example 1)

EXAMPLE 7

9.5 g. (0.1 mol) of MgCl$_2$, 4.1 g. (0.025 mol) of Al(OEt)$_3$ and 2.2 g. of Ti(0-nBu)$_4$ were pulverized together in the same way as in Example 1, to give a solid with 20.5 mg. of titanium per g. supported. A polymerization was conducted for 45 min. in the same manner as in Example 1 except that 33 mg. of the said solid was used, to yield 96 g. of white polyethylene with a melt index of 21 and a bulk density of 0.31. The catalyst activity was 47,300 g. polyethylene/g. Ti·hr.·C$_2$H$_4$ pressure 970 g. polyethylene/g. solid·hr.·C$_2$H$_4$ pressure.

EXAMPLE 8

9.5 g. (0.1 mol) of $MgCl_2$, 5 g. (0.025 mol) of Al(OiPr)$_3$ and 2.7 g. of $TiCl_4$ were pulverized together in the same way as in Example 1 to give a solid with 38.5 mg. of titanium per g. supported. A polymerization was carried out for 45 min. in the same manner as in Example 1 except that 51 mg. of the above catalyst was employed, to yield 250 g. of white polyethylene with a melt index of 15 and a bulk density of 0.32. The catalyst activity was 42,500 g. polyethylene/g. Ti·hr.·$C_2H_4$ pressure, 1,640 g. polyethylene/g. solid·hr.·$C_2H_4$ pressure.

EXAMPLE 9

9.5 g. (0.1 mol) of $MgCl_2$, 1.3 g. (0.005 mol) of Al(OsecBu)$_3$ and 2.0 g. of $TiCl_4$ were pulverized together in the same way as in Example 1 to give a solid with 39 mg. of titanium per g. supported. A polymerization was carried out for 45 min. in the same manner as in Example 1 except that 38 mg. of the above catalyst was employed, to yield 180 g. of white polyethylene with a melt index of 24 and a bulk density of 0.35. The catalyst activity was well balanced; 40,500 g. polyethylene/g. Ti·hr.·$C_2H_4$ pressure, 1,580 g. polyethylene/g. solid·hr.·$C_2H_4$ pressure.

EXAMPLE 10

In the same way as in Example 1 except that 35 mg. of the catalyst prepared in Example 1 was employed, hexane, triethylaluminum, the solid catalyst, and hydrogen were introduced and thereafter an ethylene-propylene mixture containing 2 mol.% propylene was supplied at 90° C. to maintain the pressure in the autoclave at 10 kg/cm² while conducting the polymerization for 45 min. As a result, there was obtained 240 g. of ethylene-propylene copolymer containing 5.3 methyl groups per 1,000 carbon atoms and having a melt index of 12 and a bulk density of 0.29. The catalyst activity was extremely high; 54,200 g. polymer/g. Ti·hr.·$C_2H_4$ pressure, 2,280 g. polymer/g. solid·hr.·$C_2H_4$ pressure.

EXAMPLE 11 a. Preparation of the catalyst 9.5 g. (0.1 mol) of a commercially available anhydrous magnesium dichloride (99.9% purity) which had been treated in the gas stream of hydrogen chloride at 350° C. for 20 hrs., 4.1 g. (0.025 mol) of aluminum triethoxide, and 2.1 g. of titanium trichloride (TACB manufactured by Toho Titanium Co.) were placed in a stainless steel pot having a content volume of 400 ml. and containing 25 stainless steel balls each ½ in. in diameter, and then subjected to ball milling for 16 hrs. at room temperature under a nitrogen atmosphere. The resulting powdered solid contained 30 mg. of titanium per g. of the solid.

b. Polymerization

A 2 liter stainless steel autoclave equipped with an induction stirrer was purged with nitrogen and charged with 1000 ml. of hexane. To it were added 3 mmol. of triethylaluminum and 28.1 mg. of the above-mentioned solid and the temperature was raised to 90° C. with stirring. The system, which was at a pressure of 2 kg/cm² from vapor pressure of the hexane, was pressurized with hydrogen to a total pressure of 5.2 kg/cm² and then with ethylene to a total pressure of 10 kg/cm² followed by initiation of the polymerization. Ethylene was continuously introduced to maintain the total pressure at 10 kg/cm² while conducting the polymerization for 1 hr. After completion of the polymerization, the polymer slurry was transferred to a beaker, from which the hexane was removed under reduced pressure to obtain 190 g. of white polyethylene with a melt index of 7.5. The catalyst activity was 47,200 g. polyethylene/g. Ti·hr.·$C_2H_4$ pressure, 1,410 g. polyethylene/g. solid·hr.·$C_2H_4$ pressure, which was much higher than that in Comparative Example 4 wherein was employed no aluminum triethoxide. A measurement was made in accordance with ASTM-D256-56 to find that the Izod impact strength of the above-mentioned polyethylene was 0.71 ft-lb/in., while a measurement made in accordance with ASTM-D-1822 confirmed that the tensile impact strength of the same polyethylene was 45 kg.-cm/cm². In both the said cases, as can be seen, the polyethylene proved to have a high strength.

COMPARATIVE EXAMPLE 4

11.7 g. of magnesium dichloride which had been treated in the same way as in Example 11, and titanium trichloride (TACB manufactured by Toho Titanium Co.) were pulverized together in the same procedure as in Example 11 to give a powdered solid containing 28.0 mg. of titanium per g. of the solid. A polymerization was carried out for 1 hr. in the same manner as in Example 11 except that 33 mg. of the said solid was used, to yield 118 g. of white polyethylene with a melt index of 6.3. The catalyst activity was 25,600 g. polyethylene/g. Ti·hr.·$C_2H_4$ pressure, 740 g. polyethylene/g. solid·hr.·$C_2H_4$ pressure. A comparison of such activity with that in Example 11 showed that the activity in Example 11 was apparently higher.

The polyethylene formed had an Izod impact strength of 0.53 ft-lb/in. and a tensile impact strength of 35 kg.·cm/cm². Its melt index was lower than that of the polyethylene obtained in Example 11; however, the polyethylene in Example 11 was higher in both the said impact strengths.

EXAMPLE 12

9.5 g. (0.1 mol) of anhydrous magnesium dichloride which had been treated in the same way as in example 11. 4.1 g. (0.025 mol) of aluminum triethoxide and 4.4 g. of a solid obtained by reaction at 150° C. of titanium tetrachloride with ethylmagnesium bromide were pulverized together in the same manner as in Example 11 to give a powdered solid containing 39 mg. of titanium per g. of the solid. A polymerization was carried out for 1 hr. in the same manner as in Example 11 except that 31.6 mg. of the said solid was employed, to yield 205 g. of white polyethylene with a melt index of 6.1. The catalyst activity was extremely high 34,600 g. polyethylene/g. Ti·hr.·$C_2H_4$ pressure, 1,350 g. polyethylene/g. solid·hr.·$C_2H_4$ pressure.

The polyethylene formed was superior in impact resistance, with an Izod impact strength of 0.85 ft-lb/in. and a tensile impact strength of 51 kg.·cm/cm².

COMPARATIVE EXAMPLE 5

10 g. of anhydrous magnesium dichloride which had been treated in the same way as in Example 11 and 3.5 g. of the solid obtained in Example 12 by reaction of titanium tetrachloride with ethylmagnesium bromide, were pulverized together in the same procedure as in Example 11 to give a powdered solid containing 41 mg. of titanium per g. of the solid. A polymerization was carried out for 1 hr. in the same manner as in Example 11 except that 32.3 mg. of the powdered solid was employed, to yield 105 g. of polyethylene with a melt index of 5.0. The catalyst activity was 16,500 g. polyethylene/g. Ti·hr.·C$_2$H$_4$ pressure, 680 g. polyethylene/g. solid·hr.·C$_2$H$_4$ pressure. The catalyst activity in Example 12 was much higher.

The polyethylene formed had an Izod impact strength of 0.64 ft-lb/in. and a tensile impact strength of 40 kg.·cm/cm$^2$. Its melt index was lower that that of the polyethylene obtained in Example 12; however, the polyethylene obtained in Example 12 was higher in both the said impact strengths.

EXAMPLE 13

9.5 g. (0.1 mol) of anhydrous magnesium dichloride which had been treated in the same way as in Example 11, 4.1 g. of aluminum triethoxide and 2.4 g. of vanadium trichloride were pulverized together in the same procedure as in Example 11 to give a powdered solid containing 48 mg. of vanadium per g. of the solid. A polymerization was carried out for 1 hr. in the same manner as in Example 11 except that 36.4 mg. of the said solid was employed, to yield 182 g. of white polyethylene with a melt index of 4.9. The catalyst activity was high 20,100 polyethylene/g. V·hr.·C$_2$H$_4$ pressure, 1,040 g. polyethylene/g. solid·hr.·C$_2$H$_4$ pressure.

The polyethylene formed was very high in strength, with an Izod impact strength of 1.01 ft-lb/in. and a tensile impact strength of 64 kg.·cm/cm$^2$.

COMPARATIVE EXAMPLE 6

13.6 g. of anhydrous magnesium dichloride which had been treated in the same way as in Example 11 and 2.5 g. of vanadium trichloride were pulverized together in the same procedure as in Example 11 to give a powdered solid containing 50 mg. of vanadium per g. of the solid. A polymerization was carried out for 1 hr. in the same manner as in Example 11 except that 34.2 mg. of the above solid was employed, to yield 103 g. of polyethylene with a melt index of 4.5. the catalyst activity was 12,500 g. polyethylene/g. V·hr.·C$_2$H$_4$ pressure, 625 g. polyethylene/g. solid·hr.·C$_2$H$_4$ pressure. the catalyst activity in Example 13 was far higher.

The polyethylene formed had an Izod impact strength of 0.72 ft-lb/in. and a tensile impact strength of 43 kg.·cm/cm$^2$. Its melt index was lower than that of the polyethylene obtained in Example 13 however the polyethylene obtained in Example 13 was superior in impact resistance, with higher values in both the Izod and tensile impact strengths.

EXAMPLE 14

9.5 g. (0.1 mol) of anhydrous magnesium dichloride which had been treated in the same way as in Example 11, 5 g. (0.025 mol) of aluminum triisopropoxide and 2.3 g. of titanium trichloride were pulverized together in the same procedure as in Example 11 to give a powdered solid containing 33 mg. of titanium per g. of the solid. A polymerization was carried out for 1 hr. in the same manner as in Example 11 except that 36.8 mg. of the above solid was employed to yield 198 g. of white polyethylene with a melt index of 8.3. The catalyst activity was high: 34,000 g. polyethylene/g. Ti·hr.·C$_2$H$_4$ pressure, 1,120 g. polyethylene/g. solid·hr.·C$_2$H$_4$ pressure.

The polyethylene formed had an Izod impact strength of 0.67 ft-lb/in. and a tensile impact strength of 43 kg.·cm/cm$^2$.

EXAMPLE 15

In the same way as in Example 11 except that 29.4 mg. of the solid prepared in Example 11 was employed, hexane, triethylaluminum, the solid catalyst, and hydrogen were introduced and thereafter an ethylene-propylene mixture containing 2 mol.% propylene was supplied at 90° C. to maintain the pressure in the autoclave at 10 kg/cm$^2$ while conducting the polymerization for 1 hr. As a result, there was obtained 229 g. of ethylene-propylene copolymer containing 5.8 methyl groups per 1,000 carbon atoms and having a melt index of 5.2. The catalyst activity was extremely high; 54,000 g. polyethylene/g. Ti·hr.·C$_2$H$_4$ pressure 1,620 g. polyethylene/g. solid·hr.·C$_2$H$_4$ pressure. The polymer formed was excellent in impact resistance, with an Izod impact strength of 1.08 ft-lb/in. and tensile impact strength of 68 kg. cm/cm$^2$.

We claim:

1. Process for preparing polyolefins wherein the olefin polymerization is effected in the presence of organometallic compounds of metals of Groups I to IV of the periodic Table and a catalyst prepared by copulverizing in an inert gas atmosphere (A) a magnesium dihalide, (B) an aluminum compound of the formula Al(OR)$_3$ wherein R is a hydrocarbon radical which may be the same or different in a specific compound and (C) a compound selected from the group consisting of divalent vanadium compounds, trivalent vanadium compounds, divalent titanium compounds, trivalent titanium compounds and tetravalent titanium compounds, wherein the Mg/Al ratio molar ratio ranges from 1:0.01 to 1:1, and said catalyst comprises 0.5 to 10 weight percent titanium and/or vanadium.

2. Process according to claim 1 wherein said organometallic compounds are selected from the group consisting of triethylaluminum, triisobutylaluminum, trihexyl aluminum, trioctylaluminum, diethylaluminum chloride, ethylaluminum sesquichloride, diethylzinc and mixtures thereof.

3. Process according to claim 1 wherein said magnesium dihalide is selected from the group consisting of magnesium difluoride, magnesium dichloride, magnesium dibromide and magnesium diiodide.

4. Process according to claim 1 wherein said tetravalent titanium compound is selected from the group consisting of titanium tetrachloride titanium tetrabromide, monoethoxytitanium trichloride, diethoxytitanium dichloride, titanium tetraethoxide, dibutoxytitanium dichloride, titanium tetrabutoxide, and phenoxytitanium trichloride.

5. Process according to claim 1 wherein said solid titanium compound and/or said vanadium compound are selected from the group consisting of titanium trichloride, vanadium trichloride, titanium oxychloride, vanadium oxychloride, titanium dichloride, and vanadium dichloride.

6. Process according to claim 1 wherein said aluminum compound represented by the general formula Al(OR)$_3$ is selected from the group consisting of aluminum trimethoxide, aluminum triethoxide, monomethoxydiethoxyaluminum, aluminum tri-n-propoxide, aluminum triisopropoxide, monomethoxydiisopropoxyaluminum, aluminum tri-n-butoxide, aluminum tri-sec-butoxide, aluminum tri-t-butoxide, and aluminum triphenoxide.

7. Process according to claim 1 wherein homopolymerization of an α-olefin selected from the group consisting of ethylene, propylene or 1-butene or copolymerization of ethylene and propylene, ethylene and 1-butene or propylene and 1-butene is made.

8. Process according to claim 1 wherein the olefin polymerization is made at a temperature in the range from 20° to 300° C. under a pressure in the range from ordinary pressure to 70 kg/cm$^2$.

9. Process according to claim 1 wherein said divalent and trivalent vanadium compounds and said divalent and trivalent titanium compounds are selected from the group consisting of titanium trichloride, vanadium trichloride, titanium oxychloride, vanadium oxychloride, titanium dichloride and vanadium dichloride.

10. Process according to claim 1, wherein R comprises 1 to 8 carbon atoms, the Mg/Al molar ratio ranges from 1:0.05 to 1:0.5.

11. Process according to claim 10, wherein said magnesium dihalide is magnesium dichloride, and said Al(OR)$_3$ compound is aluminum triethoxide.

* * * * *

UNITED STATES PATENT OFFICE
CERTIFICATE OF CORRECTION

PATENT NO. : 3,991,260
DATED : November 9, 1976
INVENTOR(S) : Kazuo Matsuura et al.

It is certified that error appears in the above-identified patent and that said Letters Patent are hereby corrected as shown below:

Col. 5, line 56, "40,000" should read as --40,400--

Col. 8, line 24, "28.0" should read as --29.0--

Signed and Sealed this

Twenty-ninth Day of March 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,991,260  Dated November 9, 1976

Inventor(s) Kazuo Matsuura et al.

It is certified that error appears in the above-identified patent and that said Letters Patent are hereby corrected as shown below:

"Assignee" Nippon Oil Corporation Ltd." should read as

-- Assignee: Nippon Oil Company, Limited --.

Signed and Sealed this

Twenty-fourth Day of May 1977

[SEAL]

Attest:

RUTH C. MASON
Attesting Officer

C. MARSHALL DANN
Commissioner of Patents and Trademarks